United States Patent
Vasconcelos et al.

(10) Patent No.: US 11,238,100 B2
(45) Date of Patent: Feb. 1, 2022

(54) ADAPTING CONVERSATIONAL AGENT COMMUNICATIONS TO DIFFERENT STYLISTIC MODELS

(71) Applicant: International Business Machines Corporation, Armonk, NY (US)

(72) Inventors: Marisa Affonso Vasconcelos, São Paulo (BR); Paulo Rodrigo Cavalin, Rio de Janeiro (BR); Claudio Pinhanez, São Paulo (BR); Heloisa Caroline De Souza Pereira Candello, São Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 99 days.

(21) Appl. No.: 16/804,561

(22) Filed: Feb. 28, 2020

(65) Prior Publication Data
US 2021/0271713 A1 Sep. 2, 2021

(51) Int. Cl.
*G10L 13/00* (2006.01)
*G10L 13/033* (2013.01)
(Continued)

(52) U.S. Cl.
CPC ........ *G06F 16/90332* (2019.01); *G10L 13/00* (2013.01); *G10L 13/0335* (2013.01); *G10L 15/063* (2013.01); *G10L 15/1822* (2013.01)

(58) Field of Classification Search
CPC ... G10L 13/00; G10L 13/0335; G10L 15/063; G10L 15/1822; G06F 16/90332
See application file for complete search history.

(56) References Cited

U.S. PATENT DOCUMENTS 6,374,224 B1    4/2002  Horiguchi et al.
9,473,637 B1   10/2016  Venkatapathy et al.
(Continued)

FOREIGN PATENT DOCUMENTS

KR    20040094233 A    11/2004

OTHER PUBLICATIONS ip.com "Gender-Aware Natural Language Translation" IPCOM000255696D; Oct. 10, 2018 (10 pages).
(Continued)

*Primary Examiner* — Sonia L Gay
(74) *Attorney, Agent, or Firm* — Cantor Colburn LLP; Joseph Petrokaitis (57) ABSTRACT

A computer system includes a processor configured to execute a conversational agent generator function. The conversational agent generator function is configured to receive a plurality of model input queries. Each model input query includes an intent and a corresponding answer to the intent. A database stores a corpus including sets of textual responses indicative of a common meaning. Each textual response in a given set of textual responses indicates a common meaning constructed in a different style indicative of a corresponding tone of communication. The processor is further configured to execute a rephrasing function configured determine the answer of one of the plurality of model input queries, and convert the answer of one of the plurality of model input queries into a plurality of different rephrased answers from the corpus stored in the database. The processor further outputs the plurality of different rephrased answers to the conversational agent generator function.

18 Claims, 6 Drawing Sheets

(51) Int. Cl.
  *G10L 15/06*     (2013.01)
  *G10L 15/18*     (2013.01)
  *G06F 16/9032*   (2019.01)

(56) References Cited

U.S. PATENT DOCUMENTS

| | | |
|---|---|---|
| 9,847,084 B2 | 12/2017 | Gustafson et al. |
| 2007/0294229 A1 | 12/2007 | Au |
| 2012/0095835 A1 | 4/2012 | Makar et al. |
| 2016/0300570 A1 | 10/2016 | Gustafson et al. |
| 2019/0001219 A1* | 1/2019 | Sardari ................. A63F 13/424 |
| 2019/0103127 A1* | 4/2019 | Tseretopoulos ....... G06F 40/247 |
| 2019/0115008 A1 | 4/2019 | Jiang et al. |

OTHER PUBLICATIONS

Liscombe et al. "Using Context to Improve Emotion Detection in Spoken Dialog Systems" 9th European conference on speech communication and technology, Lisbon, Portugal (2005) (4 pages).

Shah et al. "Building a conversational agent overnight with dialogue self-play" arXiv preprint arXiv:1801.04871; Jan. 15, 2018 (11 pages).

* cited by examiner

ADAPTING CONVERSATIONAL AGENT COMMUNICATIONS TO DIFFERENT STYLISTIC MODELS

BACKGROUND

The present invention generally relates to computer systems, and more specifically, to, a computer system configured to generate a conversational agent that is adapted to communicate in different styles.

A conversational agent (sometimes referred to as a "chatbot") is a computer program that can conduct a conversation with a human being. Conversational agents are typically used in dialog systems for various practical purposes, including customer service or information acquisition. Recent advances in artificial intelligence (AI) machine learning technologies have made it possible for conversational agents to engage in increasingly sophisticated conversations. Accordingly, conversational agents have become popular in a wide variety of applications such as, for example, home banking, call centers, technical support, and children toy entertainment.

SUMMARY

Embodiments of the present invention are directed to adapting conversational agent communications to different stylistic models. A non-limiting computer-implemented method of adapting communications generated by a conversational agent to different stylistic models. The method includes operations comprising receiving, at a conversational agent generator computing system, a plurality of model input queries. Each model input query includes an intent and a corresponding answer to the intent. The method further includes storing, via a knowledge database, a corpus including sets of textual responses indicative of a common meaning. Each textual response in a given set constructed in a different style indicative of a corresponding tone of communication. The method further includes determining, via a rephrasing engine in electrical communication with the conversational agent generator and the knowledge database, the answer of a given model input query. The method further includes converting, via the rephrasing engine, the answer into a plurality of different rephrased answers from the corpus stored in the knowledge database, and outputting, via the rephrasing engine, the plurality of different rephrased answers to the conversational agent generator.

According to another non-limiting embodiment, a computer system includes a processor configured to execute a conversational agent generator function. The conversational agent generator function is configured to receive a plurality of model input queries. Each model input query includes an intent and a corresponding answer to the intent. A database stores a corpus including sets of textual responses indicative of a common meaning. Each textual response in a given set of textual responses indicates a common meaning constructed in a different style indicative of a corresponding tone of communication. The processor is further configured to execute a rephrasing function configured determine the answer of one of the plurality of model input queries, and convert the answer of one of the plurality of model input queries into a plurality of different rephrased answers from the corpus stored in the database. The processor further outputs the plurality of different rephrased answers to the conversational agent generator function.

According to yet another non-limiting embodiment, a computer program product comprises a computer readable storage medium having program instructions embodied therewith. The program instructions are executable by a processor to cause the processor to perform operations comprising receiving, at a conversational agent generator computing system, a plurality of model input queries. Each model input query includes an intent and a corresponding answer to the intent. The method further includes storing, via a knowledge database, a corpus including sets of textual responses indicative of a common meaning. Each textual response in a given set constructed in a different style indicative of a corresponding tone of communication. The method further includes determining, via a rephrasing engine in electrical communication with the conversational agent generator and the knowledge database, the answer of a given model input query. The method further includes converting, via the rephrasing engine, the answer into a plurality of different rephrased answers from the corpus stored in the knowledge database, and outputting, via the rephrasing engine, the plurality of different rephrased answers to the conversational agent generator.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Conversational agents have become popular in several different scenarios and applications such as, for example, home banking, call centers, and child conversation.

Advances in artificial intelligence and machine learning has made it possible to customize a conversational agent for a given application. However, the customization of a conversation agent can prove to be costly, time consuming and/or limited to a common theme or textual corpus. These limitations have made it difficult and impractical to generate conversational agents to provide similar responses to user queries, but with different stylistic models, tones and/or personalities. Consequently, a conversational agent having a first tone (e.g., a funny personality) for one application or environment (e.g., child entertainment) may not be suitable when employed in one or more different types of applications or environments (e.g., technical support).

One or more embodiments of the present invention provide technical solutions to one or more of these disadvantages of existing solutions by providing a computer-based system and computer-implemented methods configured to conveniently adapt communications generated by a conversational agent to different stylistic models or tones. In particular, one or more non-limiting embodiments of a system is provided that includes a rephrasing engine capable of being trained on a corpus containing pairs of texts. For example, a first text can be written in a first style and/or tone to fit with a first application or environment (e.g., technical support), while a second text can be written in a different second style and/or tone to fit a different second application or environment (e.g., child entertainment). Although the first and second texts have different styles that can convey two different tones, they both convey the same meaning. In this manner, a conversational agent can be generated and its communications can be conveniently adapted to fit a targeted application or environment.

Figure 1:
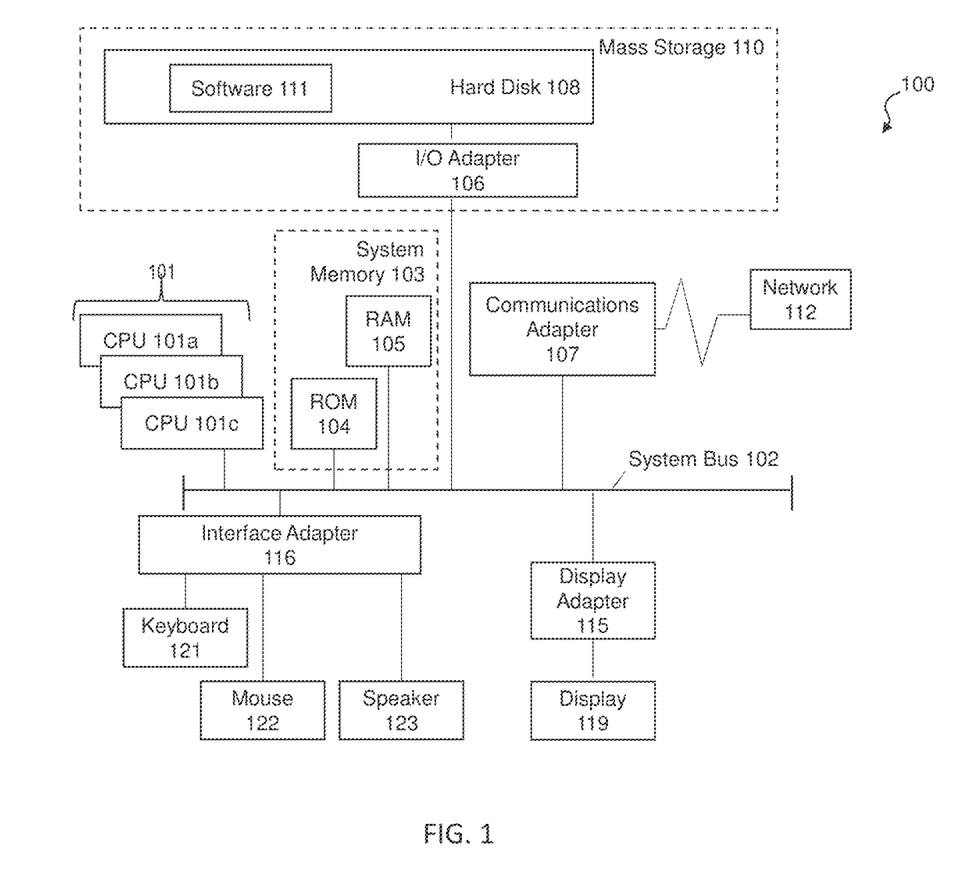
FIG. 1 is a block diagram of an example computer system for use in conjunction with one or more embodiments of the present invention.

With reference now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 can be, for example, a server, desktop computer, laptop computer, tablet computer, or smartphone. In some examples, computer system 100 can be a cloud computing node. Computer system 100 can be described in the general context of computer system executable instructions, such as program modules, being executed by a computer system. Generally, program modules can include routines, programs, objects, components, logic, data structures, and so on that perform particular tasks or implement particular abstract data types. Computer system 100 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and can include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 can be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 can be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which can be an outside network, enabling the computer system 100 to communicate with other such systems. In one embodiment, a portion of the system memory 103 and the mass storage 110 collectively store an operating system, which can be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116. In one embodiment, the adapters 106, 107, 115, and 116 can be connected to one or more I/O buses that are connected to the system bus 102 via an intermediate bus bridge (not shown). A display 119 (e.g., a screen or a display monitor) is connected to the system bus 102 by the display adapter 115, which can include a graphics controller to improve the performance of graphics intensive applications and a video controller. A keyboard 121, a mouse 122, a speaker 123, etc., can be interconnected to the system bus 102 via the interface adapter 116, which can include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 can be a cellular network, a radio network, a wide area network (WAN), a local area network (LAN), or the Internet, among others. An external computing device can connect to the computer system 100 through the network 112. In some examples, an external computing device can be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 can be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
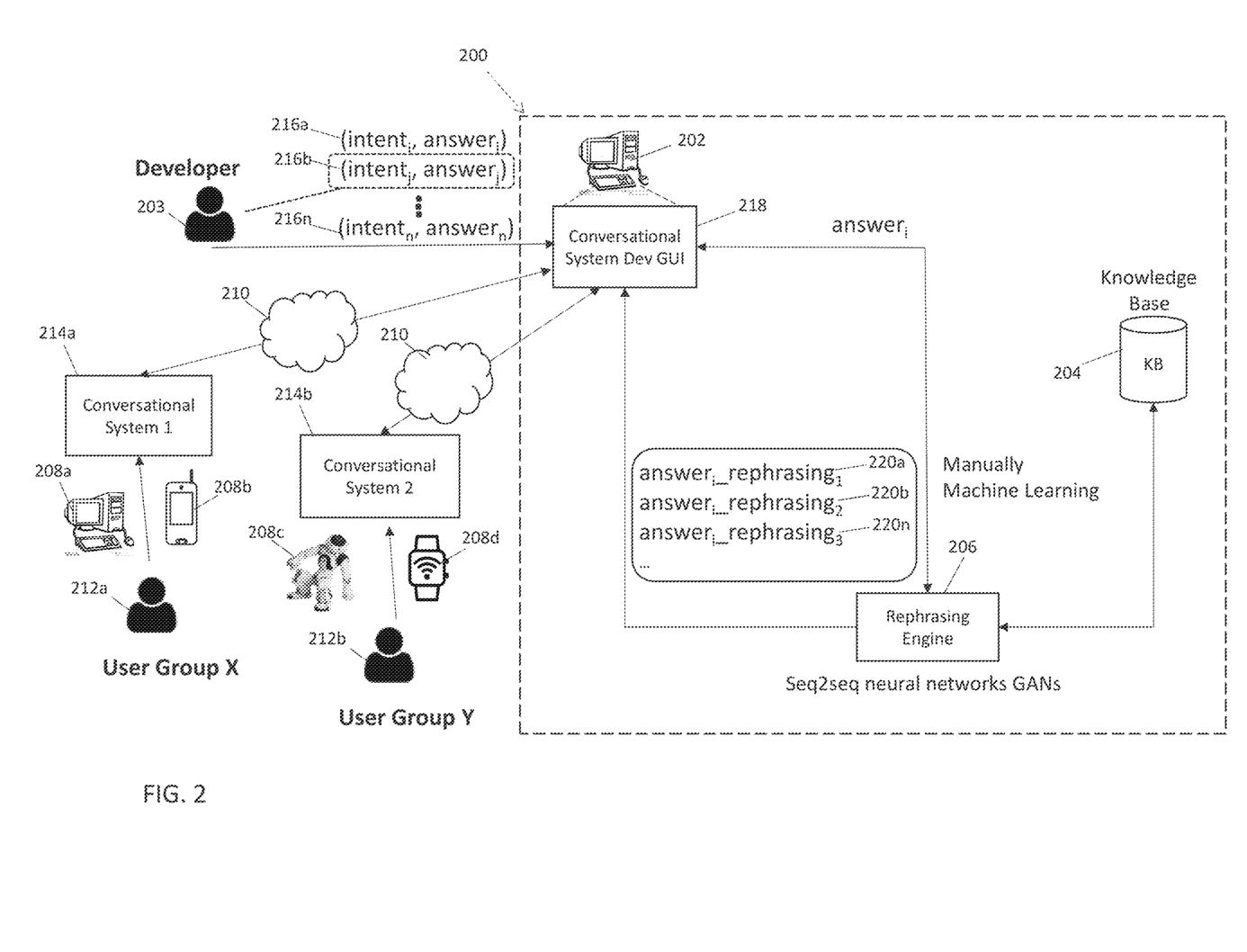
FIG. 2 is a block diagram of an example conversational agent generator system capable of adapting conversational agent communications to different stylistic models according to a non-limiting embodiment of the present invention.

Turning now to FIG. 2, a conversational agent generator system 200 configured to adapt conversational agent communications to different stylistic models is illustrated according to a non-limiting embodiment of the present invention. The conversational agent generator system 200 includes a conversational agent generator computing system 202, a knowledge database 204, and a rephrasing engine 206.

In one or more non-limiting embodiments of the invention, the conversational agent generator computing system 202 is in electrical communication with one or more user devices 208a, 208b, 208c, and 208d via a communication network 210 such as, for example, a wireless cloud computing network 210. The communication network 210 can be the same network or two different and independent networks that allow the user devices 208a, 208b, 208c, and 208d to communicate with the conversational agent generator system 200. The user devices 208a, 208b, 208c, and 208d are operable by a user 212a and 212b, respectively, and can include a local conversational agent, i.e., a chatbot, stored and operated locally thereon to establish a respective local conversation system 214a and 214b or local chat session between the user 212a and 212b and the respective user devices 208a, 208b, 208c, and 208d. The respective user devices 208a, 208b, 208c, and 208d include, but are not limited to, a desktop computer, a laptop computer, a tablet computer, a smartphone, a smart wearable device, an electronic children toy, or any other electronic device capable of operating a conversational agent locally thereon. In some embodiments, the user devices 208a, 208b, 208c, and 208d can locally operate a conversational agent stored locally on the user device, while in other embodiments the user devices 208a, 208b, 208c, and 208d can locally operate a conversational agent stored remotely from the user device such as, for example, in a cloud network.

The conversational agent generator computing system 202 is configured to receive a plurality of model input queries 216a, 216b, 216n generated by a developer 203. Each model input query 216a, 216b, 216n includes an intent (i.e., an intended or expected communication in response to the input query) and a corresponding communication matched to the intent, where each intent indicates a purpose or a goal. The conversational agent generator computing system 202 is further configured to generate a graphical user interface (GUI) 218, which allows for dynamically adapting communications generated by a conversational agent to different stylistic models or tones of communication as described in greater detail below.

The knowledge database 204 is configured to store a corpus including sets of textual responses indicative of a common meaning. Each textual response in a given set is constructed in a different style or stylistic model indicative of a corresponding tone of communication. The tone of communication can include, but is not limited to, a funny tone or personality, a simple tone or personality, a formal tone or personality, an informal tone or personality, a technical tone or personality, a medical tone or personality, and a financial tone or personality.

The rephrasing engine 206 is in electrical communication with the conversational agent generator computing system 202 and the knowledge database 204. The rephrasing engine 206 is configured to receive a communication and convert the communication into a plurality of different rephrased communications having a common meaning. In some embodiments of the invention, the communication is an answer to a query, and the rephrasing engine 206 is configured to receive the communication as an answer of a given model input query 216a, 216b, 216n, and convert the answer into a plurality of different rephrased answers 220a, 220b, 220n having a common meaning. Although this detailed description described embodiments of the invention where the communication is an answer to a query, these features and functionality of these embodiments apply equally to implementations of aspects of the invention where the communication is not prompted by a query.

In one or more non-limiting embodiments of the invention, the rephrasing engine 206 employs a sequence-to-sequence (seq2seq) model capable of automatically generating the rephrased answers 220a, 220b, 220. Each rephrased answer 220a, 220b, 220n corresponds to a respective tone of communication (i.e., talking style or style of conversation) that is generated using the corpus stored in the knowledge database 204. Once the rephrased answers 220a, 220b, 220n are generated, they are output the conversational agent generator computing system 202 where they can be displayed on the GUI 218. In the example illustrated in FIG. 2, the answer of a given model input query (e.g., 216b) is selected by the developer 203. In this manner, the developer 203 may specifically choose one or more given model input queries with an answer that is to be converted into different rephrased answers 220a, 220b, 220n having a common meaning, but with different tones of communication. For example, rephrased answer 220a can be generated with a funny tone or personality, rephrased answer 220b can be generated with a formal tone or personality, and rephrased answer 220n can be generated with a technical tone or personality.

The seq2seq model utilized by the rephrasing engine 206 is defined according to a seq2seq recurrent neural network architecture, also referred to as a long short-term memory (LSTM) architecture. This seq2seq model can be stored in memory. Seq2seq modeling is an effective way of using the LSTM recurrent neural network architecture. The general LSTM seq2seq has two different LSTM cells, used for input and output. The cell for the input is referred to as the encoder and its purpose is to convert variable length sentences into fixed sized vector representations. Sentences that are similar in meaning can have similar vector representations. The cell used for the output is referred to as the decoder and its purpose is to find the conditional probability for outputs with respect to inputs. In this regard, the first LSTM encoder cell finds the vector representation of the given inputs which is then fed to the second LSTM decoder cell as initial values to calculate the conditional probability.

Figure 3:
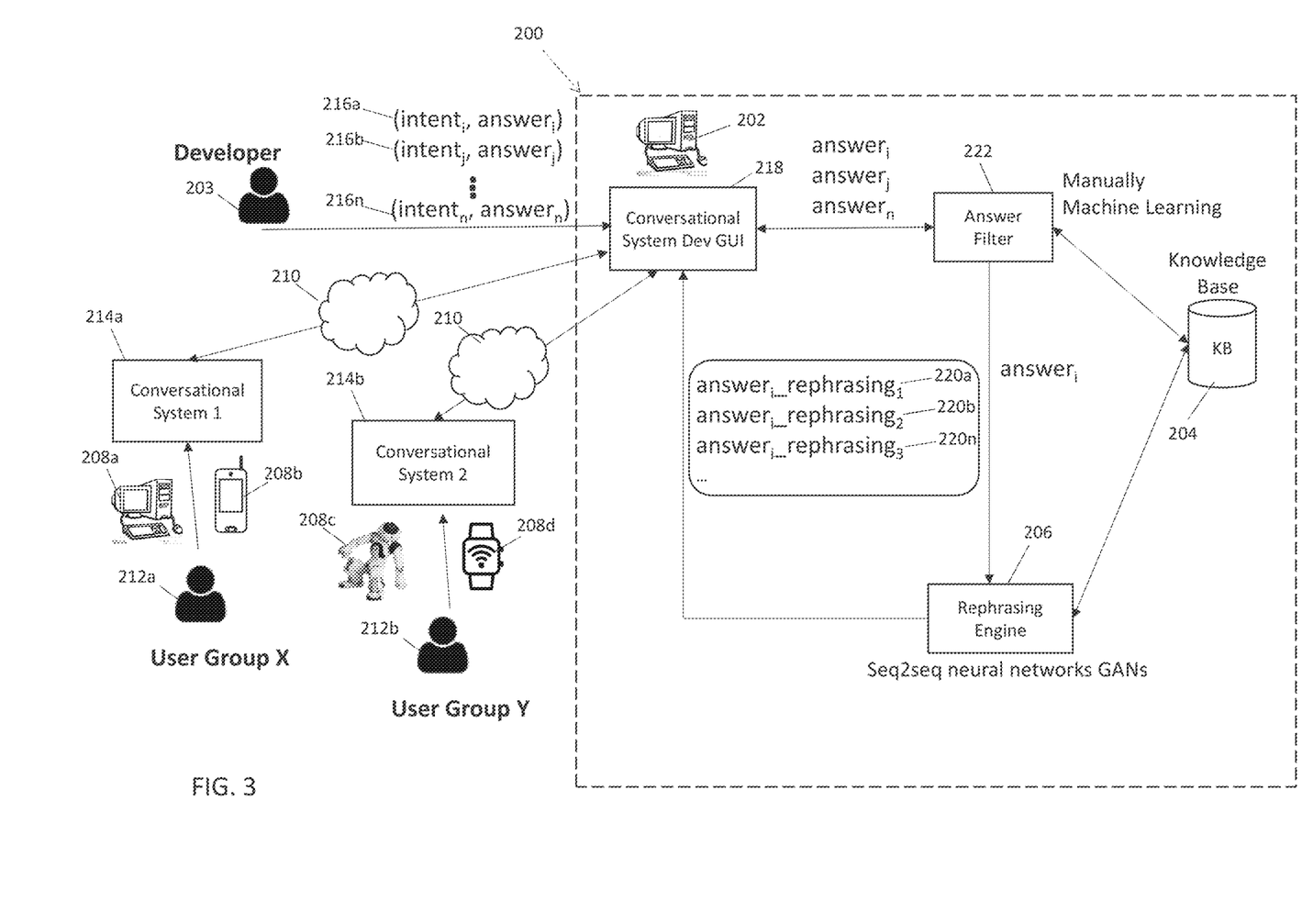
FIG. 3 is a block diagram of an example conversational agent generator system capable of adapting conversational agent communications to different stylistic models according to another non-limiting embodiment of the present invention.

Referring to FIG. 3, one or more non-limiting embodiments of the conversational agent generator system 200 can include an answer filtering unit 222. The answer filtering unit 222 is in electrical communication with the conversational agent generator computing system 202 and the rephrasing engine 206. The answer filtering unit 206 is configured to identify at least one biased answer from among the plurality of model input queries 216a, 216b, 216n, and to return the at least one biased answer (e.g., answer$_i$) to the conversational agent generator computing system 202. A biased answer can be referred to as an answer having a bias toward a tone of communication including, but not limited to, a funny tone, a simple tone, a formal tone, an informal tone, a technical tone, a medical tone, a financial tone, a masculine tone, a feminine tone, or youthful tone. In one or more non-limiting embodiments of the invention, the answer filtering unit 206 can include a machine learning model the outputs a distribution of tones associated with the answers. The answer filtering unit 222 can monitor the tone of generated answers and identify whether a particular tone appears too frequently, e.g., more than a set threshold X. When the frequency of the tone exceeds the threshold, the answer filtering unit 222 identifies a biased answer and triggers the rephrasing engine (206) to generate more sample answers having one or more tones different from the biased answer.

Once receiving the biased answer, the conversational agent generator computing system 202 can display it on the GUI. In this manner, the developer 203 can determine whether or not they would like to receive one or more re-phrased answers of the biased answer. When confirmed by the developer, the biased answer (e.g., answer$_i$) is sent to the re-phrasing engine.

The re-phrasing engine 206 receives the biased answer (e.g., answer$_i$) and converts it into one or more non-biased rephrased having a common meaning as the initial biased answer. For instance, if the biased answer was detected to have a biased or primarily masculine tone, the re-phrasing engine 206 can provide one or more non-biased answers having a more neutral gender tone. In either embodiment described in FIGS. 2 and 3, the conversational agent generator computing system 202 can receive one or more requests from one or more users 212, 212b to update a current tone of communication of one or more local conversational agents. More specifically, each user possesses a user device 208a, 208b, 208c, and 208d, and each user devices 208a, 208b, 208c, and 208d includes a local conversational agent configured to generate local answers to the user 212a, 212b according to a first tone of communication. Accordingly, a given user can submit a request to the conversational agent generator computing system 202 to update a current tone of communication of one or more local conversational agents in their possession. In response to the request, the conversational agent generator computing system 202 can determine whether any updated tones of communications are available for a local of a given device 208a, 208b, 208c, and 208d. If so, the conversational agent generator computing system 202 can send the updated tone of communication to the given device 208a, 208b, 208c, and 208d via the network 210, where it is loaded locally on the given device. In this manner, the local conversational agents of the user devices 208a, 208b, 208c, and 208d can be dynamically updated.

In another example, a developer 103 can update the model input queries 216a, 216b, 216n for a given user device and thus receive one or more updated answers. Once completed, the developer 103 can push the updated input queries 216a, 216b, 216n and corresponding updated answers input queries 216a, 216b, 216n to a given user device 208a, 208b, 208c, and 208d such that the tone of communication of the corresponding local conversational agent is dynamically updated.

Figure 4:
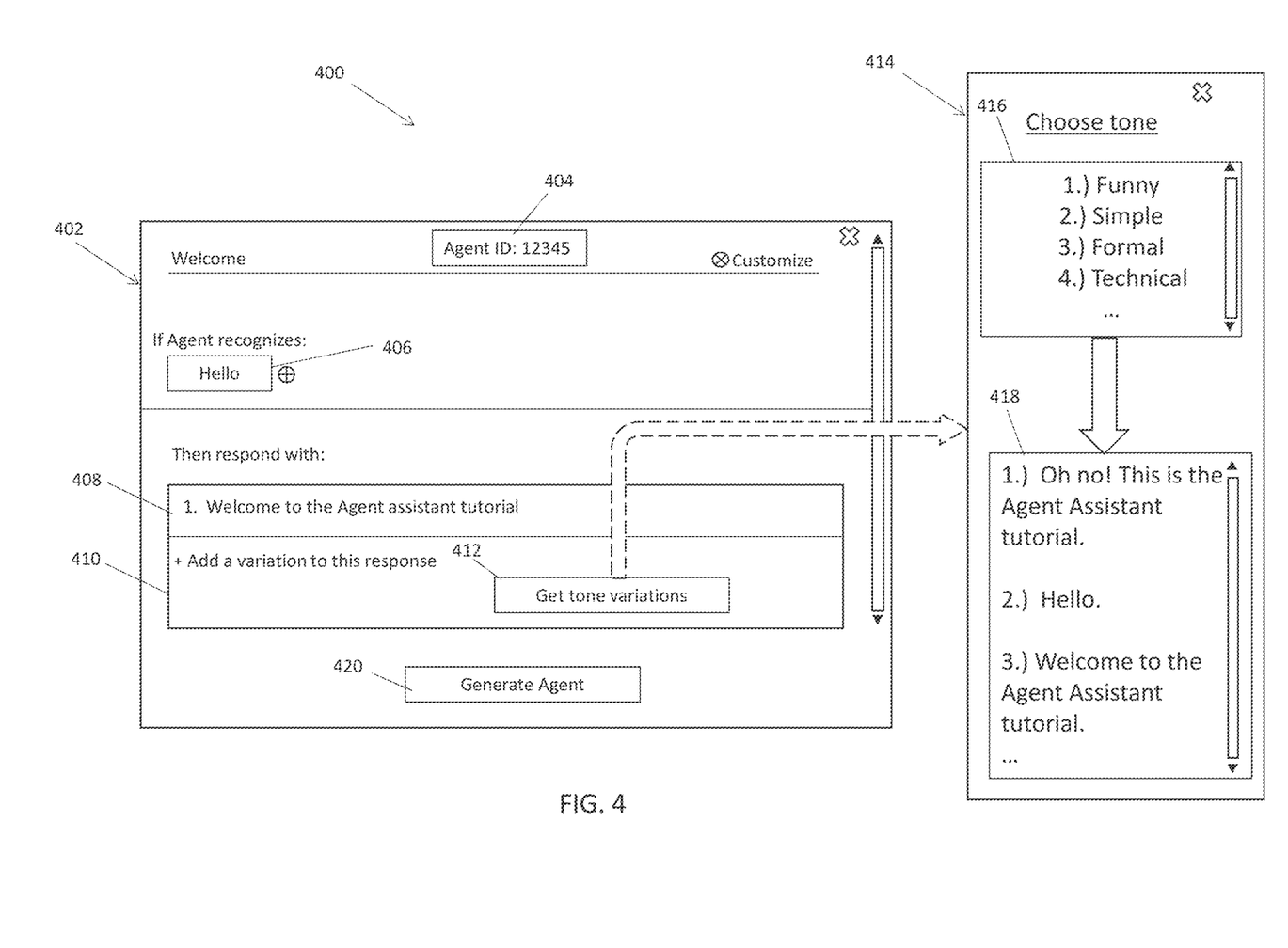
FIG. 4 is a block diagram of an example an agent generator graphic user interface (GUI) employed by a conversational agent generator system for adapting conversational agent communications to different stylistic models according to one or more non-limiting embodiments of the present invention.

Referring to FIG. 4, an example of an agent generator GUI 400 employed by a conversational agent generator system for adapting a conversational agent answers to different stylistic models according to one or more non-limiting embodiments of the present invention. The agent generator GUI 400 includes a dashboard 402 that displays an Agent identifier (ID) field 404, an Agent input query field 406, a default Agent response field 408, and a response tone variation field 410.

The Agent identifier (ID) field 404, identifies a current conversational agent (e.g., Agent ID: 12345) to be customized and adapted to answers with different stylistic models or conversational tones. The Agent input query field 406 displays a given input query that will trigger the current conversational agent to provide a response. The default Agent response field 408 indicates the current default response text that the conversational agent will respond with when triggered by the input indicated by Agent input query field 406. The response tone variation field 410 allows the developer to adapt the default response indicated in the default Agent response field 408 to one or more different variations or tones of conversation.

In one or more embodiments, a developer can select the tone variation selector 412 to invoke the tone display panel 414. The tone display panel 414 displays a tone pull-down menu 416 listing a variety of different available tones for the current default response text indicated by the Agent response field 408. In this example, the different available tones include, but are not limited to, a funny tone, a simple tone, a formal tone, and a technical tone. Each tone listed in the tone pull-down menu 416 has a corresponding textual response listed in the variation tone preview panel 418. Accordingly, a developer can review the available variations to the current default response text indicated by the Agent response field 408, and select one or more desired variations to be added to the response tone variation field 410.

Once all desired tone variations are added to the response tone variation field 410, the developer can select the Agent generator confirmation selector 420, which will cause the conversational agent generator system to generate a conversational agent (e.g., Agent ID: 12345) that will respond (e.g., by text and/or voice) with the textual response listed in the variation tone preview panel 418 in response to receiving the input query indicated by the Agent input query field 406.

Figure 5:
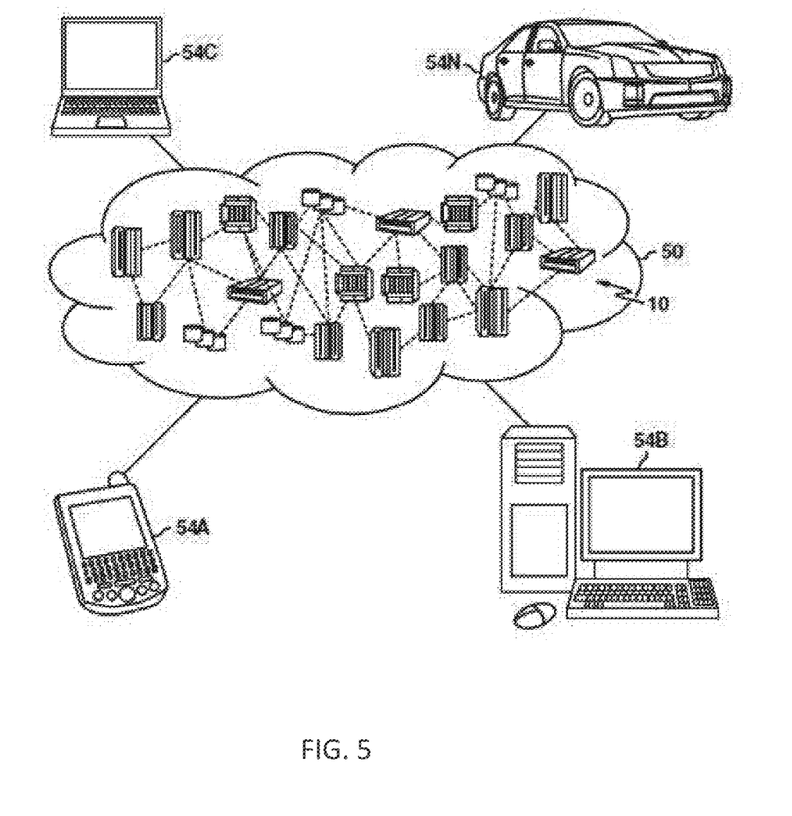
FIG. 5 depicts a cloud computing environment according to one or more embodiments of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
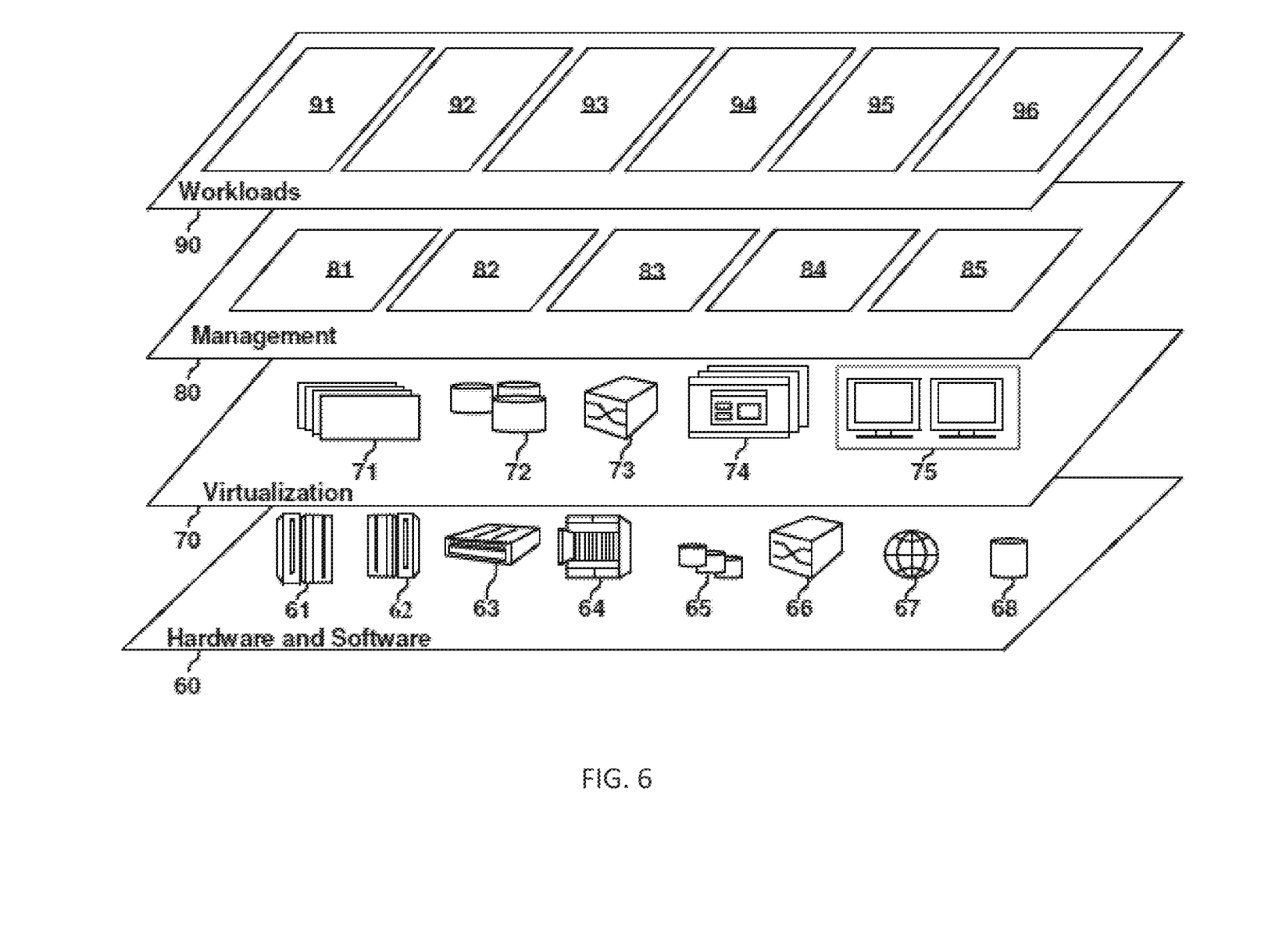
FIG. 6 depicts abstraction model layers according to one or more embodiments of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and ticket issue/sentiment tracking 96.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising,"

"includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer system comprising:
    a processor in electrical communication with a database;
    the processor configured to execute a conversational agent generator function,
    wherein the conversational agent generator function is configured to receive a plurality of model input queries, each model input query including an intent and a corresponding answer to the intent,
    wherein the database stores a corpus including sets of textual responses indicative of a common meaning, each textual response in a given set of textual responses indicative of a common meaning constructed in a different style indicative of a corresponding tone of communication, and
    wherein the processor is further configured to execute a rephrasing engine configured to:
        determine the answer of one of the plurality of model input queries;
        convert the answer of one of the plurality of model input queries into a plurality of different rephrased answers from the corpus stored in the database; and
        output the plurality of different rephrased answers to the conversational agent generator function,
    wherein the conversational agent generator computing system is further configured to perform operations comprising:
        receive at least one request to update a current tone of communication of a local conversational agent included in at least one user device located remotely from the conversational agent generator computing system;
        generate at least one updated model input query including a rephrased answer corresponding to an initial answer included in an initial model input query, the rephrased answer having a different tone of communication with respect to an initial tone of communication of the initial answer; and
        output the updated model input query including a rephrased answer to the user device,
    wherein the at least one user device updates the local conversational agent based on the updated model input query including a rephrased answer.

2. The system of claim 1, wherein each intent indicates a purpose or a goal.

3. The system of claim 1, wherein the different rephrased answers have a common meaning.

4. The system of claim 1, wherein the rephrasing engine employs a sequence-to-sequence (seq2seq) model configured to automatically generate rephrased answers corresponding to a respective tone of communication.

5. The system of claim 4, wherein the tone of communication is selected from a group comprising a funny tone, a simple tone, a formal tone, an informal tone, a technical tone, a medical tone, a financial tone, a masculine tone, a feminine tone, and a youthful tone.

6. The system of claim 1, wherein the answer of a given model input query is selected by a developer that generates the plurality of model input queries.

7. The system of claim 1, wherein the system further comprises an answer filtering unit in electrical communication with the conversational agent generator computing system and the rephrasing engine, the answer filtering unit configured to identify at least one biased answer among the plurality of model input queries.

8. The system of claim 7, wherein the answer filtering unit outputs the at least one biased answer to the conversational agent generator computing system.

9. The system of claim 8, wherein the rephrasing engine converts the at least one biased answer into a non-biased rephrased answer.

10. The system of claim 1, wherein the at least one user device includes a first user device including a first local conversational agent configured to generate local answers according to a first tone of communication, and a second user device including a second local conversational agent configured to generate local answers according to a second tone of communication.

11. A computer-implemented method of adapting answers generated by a conversational agent to different stylistic models, the method comprising:
    receiving, at a conversational agent generator computing system, a plurality of model input queries, each model input query including an intent and a corresponding answer to the intent;
    storing, via a knowledge database, a corpus including sets of textual responses indicative of a common meaning, each textual response in a given set constructed in a different style indicative of a corresponding tone of communication; and
    determining, via a rephrasing engine in electrical communication with the conversational agent generator and the knowledge database, the answer of a given model input query;
    converting, via the rephrasing engine, the answer into a plurality of different rephrased answers from the corpus stored in the knowledge database; and
    outputting, via the rephrasing engine, the plurality of different rephrased answers to the conversational agent generator;

receiving, via the conversational agent generator computing system, at least one request to update a current tone of communication of a local conversational agent included in at least one user device located remotely from the conversational agent generator computing system;

generating, via the conversational agent generator computing system, at least one updated model input query including a rephrased answer corresponding to an initial answer included in an initial model input query, the rephrased answer having a different tone of communication with respect to an initial tone of communication of the initial answer;

outputting, via the conversational agent generator computing system, the updated model input query including a rephrased answer to the user device; and updating, via the at least one user device, the local conversational agent based on the updated model input query including a rephrased answer.

12. The computer-implemented method of claim 11, wherein each intent indicates a purpose or a goal.

13. The computer-implemented method of claim 11, wherein the different rephrased answers have a common meaning.

14. The computer-implemented method of claim 11 further comprising automatically generating rephrased answers corresponding to a respective tone of communication using a sequence-to-sequence (seq2seq) model executed by the rephrasing engine.

15. The computer-implemented method of claim 14, wherein the tone of communication is selected from a group comprising a funny tone, a simple tone, a formal tone, an informal tone, a technical tone, a medical tone, a financial tone, a masculine tone, a feminine tone, and a youthful tone.

16. The computer-implemented method of claim 11, wherein the answer of a given model input query is selected by a developer that generates the plurality of model input queries.

17. The computer-implemented method of claim 11 further comprising:

identifying, via an answer filtering unit, at least one biased answer among the plurality of model input queries; and converting, via the rephrasing engine, the at least one biased answer into a non-biased rephrased answer.

18. A computer program product comprising a computer readable storage medium having program instructions embodied therewith, the program instructions executable by a processor to cause the processor to perform operations comprising:

receiving, at a conversational agent generator computing system, a plurality of model input queries, each model input query including an intent and a corresponding answer to the intent;

storing, via a knowledge database, a corpus including sets of textual responses indicative of a common meaning, each textual response in a given set constructed in a different style indicative of a corresponding tone of communication;

determining, via a rephrasing engine in electrical communication with the conversational agent generator and the knowledge database, the answer of a given model input query;

converting, via the rephrasing engine, the answer into a plurality of different rephrased answers from the corpus stored in the knowledge database; and outputting, via the rephrasing engine, the plurality of different rephrased answers to the conversational agent generator, receiving, via the conversational agent generator computing system, at least one request to update a current tone of communication of a local conversational agent included in at least one user device located remotely from the conversational agent generator computing system;

generating, via the conversational agent generator computing system, at least one updated model input query including a rephrased answer corresponding to an initial answer included in an initial model input query, the rephrased answer having a different tone of communication with respect to an initial tone of communication of the initial answer;

outputting, via the conversational agent generator computing system, the updated model input query including a rephrased answer to the user device; and updating, via the at least one user device, the local conversational agent based on the updated model input query including a rephrased answer.

* * * * *